United States Patent [19]

Leyshon et al.

[11] Patent Number: 5,057,687

[45] Date of Patent: Oct. 15, 1991

[54] DETECTOR ASSEMBLY WITH PLURAL OPTICAL AXES

[75] Inventors: Frank A. Leyshon, Cambridge; Herbert D. McClain, Quaker City; David A. Watson, New Concord, all of Ohio

[73] Assignee: NCR Corporation, Dayton, Ohio

[21] Appl. No.: 611,398

[22] Filed: Nov. 6, 1990

Related U.S. Application Data

[63] Continuation of Ser. No. 372,805, Jun. 29, 1989, abandoned.

[51] Int. Cl.$^5$ .............................................. H01J 5/02
[52] U.S. Cl. ..................................... 250/239; 250/216
[58] Field of Search ............... 250/566, 568, 239, 216; 235/462, 454

[56] References Cited

U.S. PATENT DOCUMENTS

| | | | |
|---|---|---|---|
| 4,029,944 | 6/1977 | Trenkamp | 235/61.11 D |
| 4,105,926 | 8/1978 | Reno et al. | 250/566 |
| 4,317,029 | 2/1982 | Warthan | 235/454 |
| 4,521,678 | 6/1985 | Winter | 235/472 |
| 4,570,057 | 2/1986 | Chadima, Jr. et al. | 235/472 |
| 4,626,671 | 12/1986 | Marshall | 235/470 |
| 4,786,798 | 11/1988 | Lonsdale | 250/216 |

Primary Examiner—David C. Nelms
Attorney, Agent, or Firm—Wilbert Hawk, Jr.; Albert L. Sessler, Jr.; Richard W. Lavin

[57] ABSTRACT

A detector assembly for use in an optical reader comprises a hollow housing in which is mounted on the central axis of the housing a collection lens, a routing mirror, a light filter and a photodetector. A routing lens mounted in the side of the housing and on an axis which is perpendicular to the central axis of the housing directs the scanning light at the routing mirror which in turn reflects the light in a scanning direction.

7 Claims, 3 Drawing Sheets

DETECTOR ASSEMBLY WITH PLURAL OPTICAL AXES

This is a continuation of co-pending application Ser. No. 372,805, filed on Jun. 29, 1989, now abandoned.

BACKGROUND OF THE INVENTION

The present invention relates to bar code readers and more particularly, to a detector assembly for use in a low cost bar code reader.

In present day optical bar code readers which are utilized in checkout counters for reading coded labels attached to the purchased merchandise items, a demand has arisen for the development of low cost compact scanners which can be used where the checkout operator is in a sitting position during the checkout operation. An example of this type of optical scanner may be found in U.S. Pat. No. 4,797,551 which is assigned to the assignee of the present application. As the elements of the scanner and the distances between the elements become smaller, it was found that the alignment of the optical elements to each other became very hard to accomplish and very time consuming which increased the cost of the scanner.

SUMMARY OF THE INVENTION

There is provided, in accordance with the present invention, a one piece detector assembly comprising upper and lower plastic housing members which are joined together forming a unitary structure. Rigidly mounted under tight tolerances in the structure are a reflecting mirror, a routing lens, a collection lens, a light filter and a photodetector which are used in the operation of the scanner. The structure includes snap fit portions and locating pins so that it may be accurately aligned and assembled into the scanner. The assembly may be interchanged between different scanners when required.

It is therefore an object of the present invention to provide a detector assembly for mounting in a optical scanner which includes in one package all the optical elements for generating a scanning pattern except the pattern mirrors.

It is another object of the present invention to provide such a detector assembly in which the scanner elements are permanently mounted and precisely aligned in the assembly.

It is yet another object of the present invention to provide a detector assembly which can be interchanged between optical scanners and which is simple in construction and low in cost.

These and other objects, features, and advantages of the present invention will become apparent from the following description and the attached drawings.

BRIEF DESCRIPTION OF THE DRAWINGS

FIG. 5 is a front elevational view of the collection lens;

FIG. 6 is a side elevational view of the collection lens.

DETAILED DESCRIPTION OF THE PREFERRED EMBODIMENT

Figure 1:
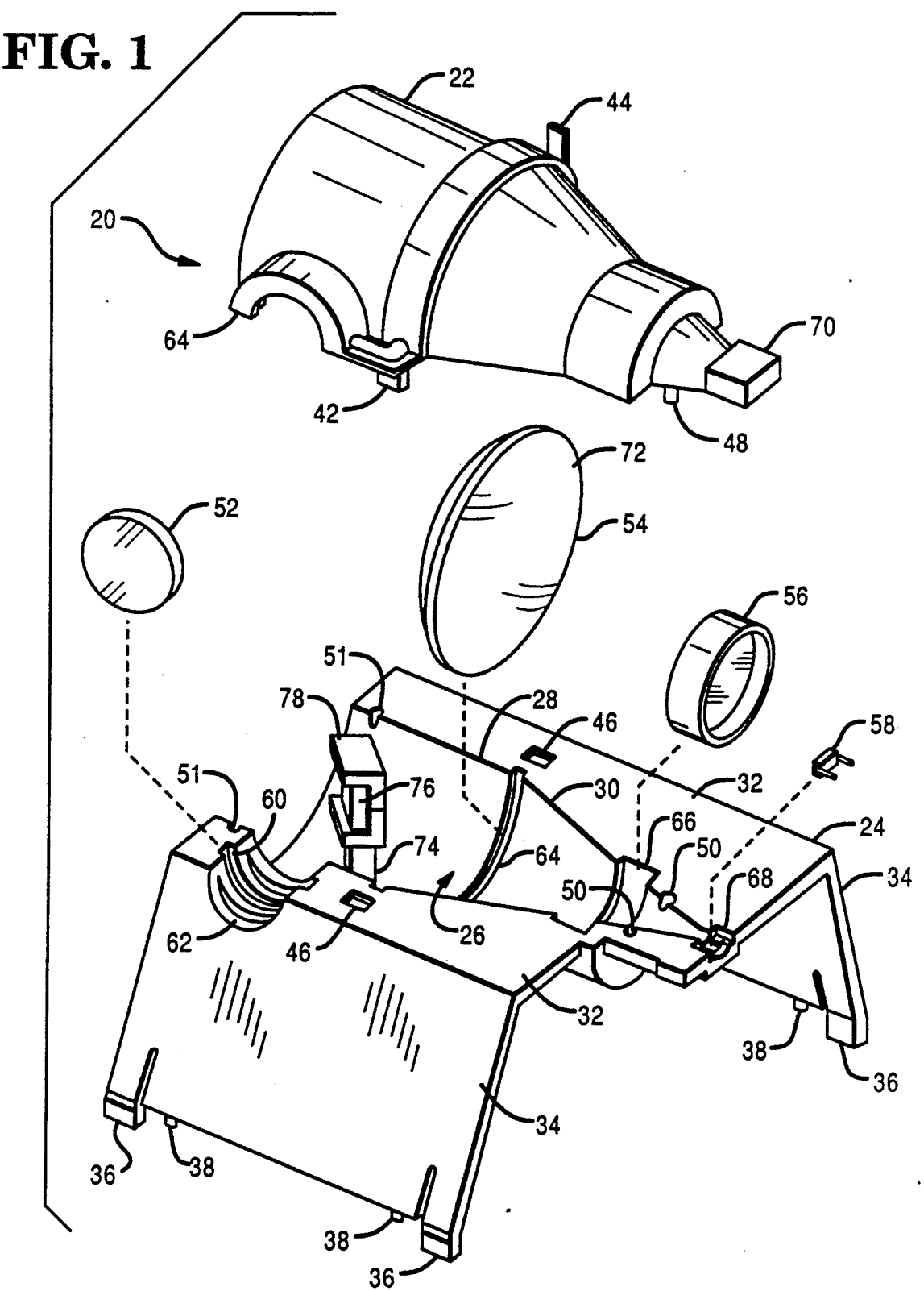
FIG. 1 is an exploded perspective view of the detector assembly of the present invention showing the location of the routing lens, the collection lens, the reflecting mirror, the light filter and the photodetector.
Figure 2:
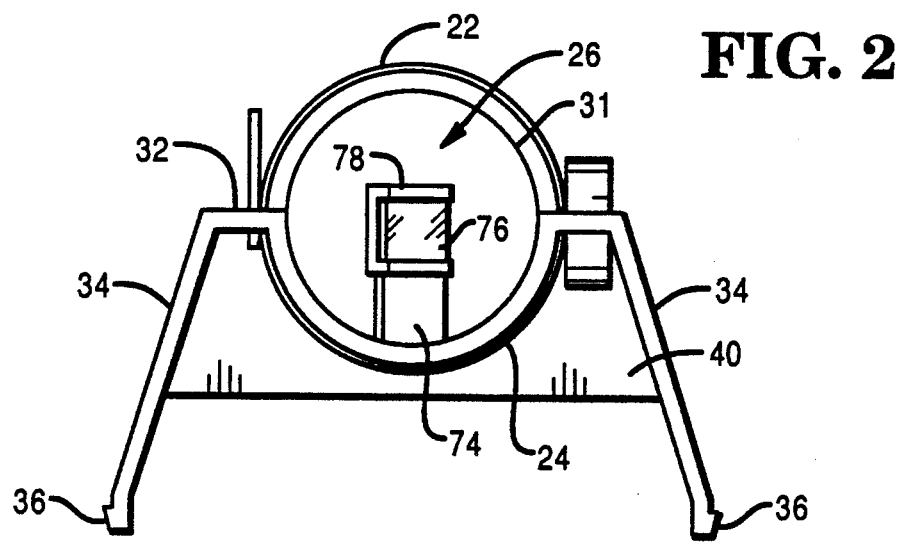
FIG. 2 is a front elevational view of the detector assembly showing the location of the reflecting mirror.
Figure 3:
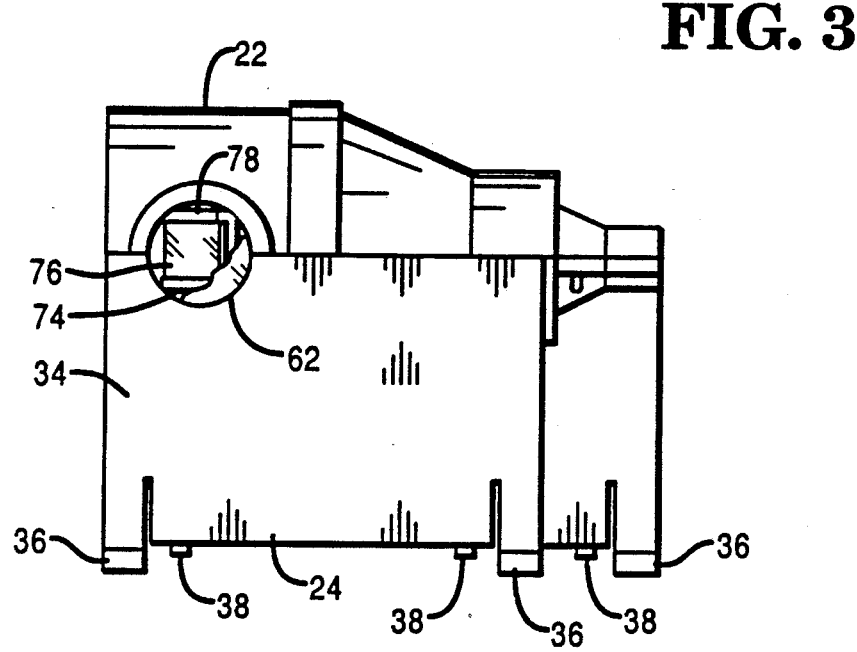
FIG. 3 is a side elevational view of the detector assembly.

Referring to FIGS. 1-4 inclusive, there are shown various views of the detector assembly of the present invention. There is shown in FIG. 1 an exploded view of the detector assembly which is generally indicated by the numeral 20 and includes an upper housing member 22 and a lower housing member 24 both of which may be molded of any type of polycarbonate plastic material. Both housing members are formed with recessed interiors which, when the housing members are joined together, form a cavity 26 (FIGS. 1 and 4) which includes a constant width front portion 28 and a cone shaped rear portion 30. As best seen in FIG. 2, the cavity 26 is formed in a circular configuration and includes a circular opening 31.

The lower housing member 24 includes a horizontal shelf portion 32 (FIGS. 1 and 4) which terminates in a pair of depending support portions 34 for supporting the assembly 20 when mounted in the optical scanner. To accomplish this mounting of the assembly, each of the support portions 34 include a pair of depending leg portions 36 which are flexible to allow the assembly to be snapped into engagement with the scanner in a manner that is well known in the art. The support portions 34 also include locating pins 38 (FIGS. 1 and 3) for locating the assembly 20 in the scanner. A rib member 40 (FIG. 2) mounted between the support portions 34 provides structural support for the support portions 34 and prevents the assembly 20 from vibrating when mounted in the scanner.

As shown in FIG. 1, the upper housing member 22 includes a pair of depending leg portions 42, one of which is shown in FIG. 1. The opposite leg portion (not shown) is rotatably secured to the side of the housing member 22 and has a movable extension portion 44 (FIGS. 1 and 4) which enables the leg portions 42 to be snapped into engagement with apertures 46 located in the shelf portion 32 of the lower housing member 24 for joining the housing members 22 and 24 together forming the assembly 20. Located towards the rear portion of the housing member 22 are a pair of depending locating pins 48 which are positioned in recessed portions 50 in the lower housing member 24 for locating the upper housing member 22 on the lower housing member 24.

Figure 4:
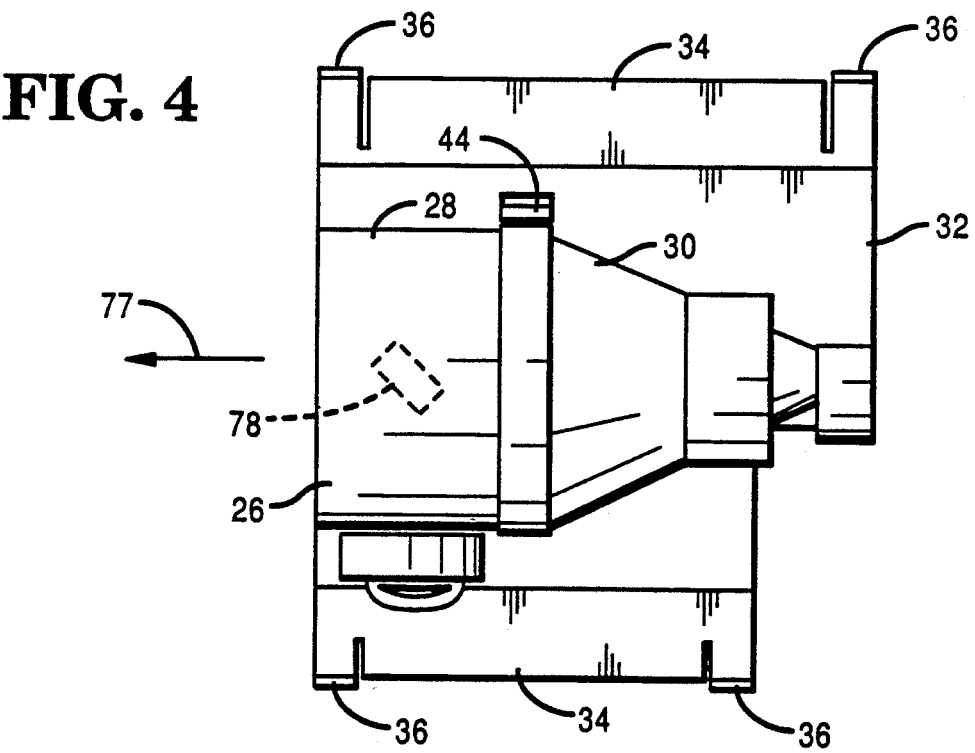
FIG. 4 is a top elevational view of the detector assembly showing the orientation of the reflecting mirror.

As shown in FIGS. 1 and 4, the lower housing member 24 includes a number of recessed areas for accommodating some of the scanning elements used in generating a scanning pattern and for generating signals representing the data read from the bar code label. Included in the elements is a routing lens 52, a collection lens 54, a light filter 56 and a photodetector 58. The routing lens 52 is mounted in a circular slot 60 located in a circular aperture 62 extending through the side of the lower housing member 24 and through a side housing extension portion 64 of the upper housing member 22 and formed when the housing members 22 and 24 are joined. The collection lens 54, the light filter 56 and the photodetector 58 are mounted on the central axis of the assembly 20. The routing lens 52 is mounted on the central axis of the aperture 62 which is perpendicular to the axis of the assembly 20.

In a similar manner, the collection lens 54 is mounted in a circular slot 64 located in the cavity 26 and formed when the housing members 22 and 24 are assembled into the assembly 20 while the light filter 56 is located in a circular slot 66 formed in a similar manner. The photodetector 58 is mounted in a slot 68 located in the shelf portion 32 of the lower housing member 24 which communicates with the end of the cavity 26 and in a rear portion 70 of the upper housing member 22. As seen in FIG. 6, the collection lens 54 has a biconcave lens configuration 55 for focusing the collected light on the photodetector 50. Because of the biconcave configuration, the lens 54 is required to have a straight edge portion 72 (FIGS. 1 and 5) for insertion in the slot 64.

Figure 7:
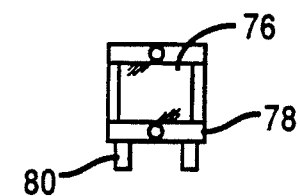
FIG. 7 is a front elevational view of the reflecting mirror mount assembly.
Figure 8:
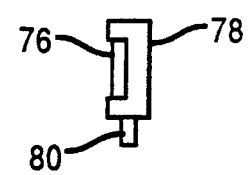
FIG. 8 is a side elevational view of the reflecting mirror mount assembly.

Referring to FIGS. 1, 2 and 4, there is shown mounted in the front portion of the cavity 26 in the lower housing member 24 a vertical support member 74 on which is mounted a routing mirror 76 (FIGS. 7 and 8) molded into a support member 78. The face of the mirror 76 is mounted at a 45 degree angle to both of the central axes of the assembly 20 and the aperture 62. A pair of locating pins 80 depending from the lower edge of the member 78 enables the member 78 and the mirror 76 to be secured to the support member 74 and to be accurately aligned with the routing lens 52 and the pattern generating mirrors (not shown) in the scanner.

During the operation of the optical reader, scanning light will be directed through the routing lens 52 which directs the light at the routing mirror 76 which in turn reflects the scanning light in a scanning direction represented by the arrow 77 in FIG. 4 and along the central axis of the assembly 20. Light reflected from the scanned coded label is directed towards the collection lens 54 which collects the light and focuses the light at the photodetector 58 through the filter 56 which filters out certain frequencies of light such as those in the ultraviolet spectrum which might interfere with the operation of the photodetector 58.

It can thus be seen that there has been provided by the present invention a low cost detector assembly which include precisely mounted and aligned optical elements, and that the assembly is constructed so that it may be easily interchanged between different optical scanners.

Although the presently preferred embodiment of the invention has been described, it will be understood that various changes may be made within the scope of the appended claims.

What is claimed is:

1. A low cost detector assembly for use with an optical reader which generates a scanning pattern for scanning a coded label and for receiving light reflected from the coded label comprising:

a housing assembly comprising an upper housing member and a lower housing member having opposite plano surfaces, said upper and lower housing members being assembled to form a unitary structure having a first central axis and including a large opening at one end and a small opening at the opposite end;

said lower housing member including an aperture portion in one of said plano surfaces, said housing assembly further including flexible means mounted on said upper housing member for engaging said aperture portion for releasably securing the upper housing member to the lower housing member;

a first optical member mounted in said unitary structure on said first central axis adjacent to and downstream from the large opening for collecting the light reflected from the coded label and for focusing the collected light at a location on said axis adjacent the small opening;

a second optical member mounted in said unitary structure on the same axis as the first optical member for filtering out selected frequencies of light from the reflected light;

said unitary structure further including an aperture having a second central axis extending in a direction perpendicular to the first central axis of said unitary structure and which is upstream from said first optical member, said unitary structure further including a third optical member mounted in said aperture for directing the scanning light along the second central axis of the aperture; and detector means mounted in said unitary structure on said first central axis adjacent the small opening and at said location for receiving the reflected light and for generating electrical signals in response to receiving the reflective light.

2. The detector assembly of claim 1 in which said lower housing member further includes a first support member mounted adjacent the large opening and upstream of the first optical member and a fourth optical member mounted on the first support member and positioned at the junction of the first central axis of the unitary structure and the second central axis of the aperture, for reflecting the light received from said third optical member along the first axis of the unitary structure in a scanning direction.

3. The detector assembly of claim 2 in which said lower housing member further includes a pair of second support members for supporting the unitary structure in the optical reader, said second support members including flexible portions for snap fitting the unitary structure into engaging with the optical reader.

4. The detector assembly of claim 3 in which the second support members further include a plurality of pin members for locating the unitary structure in the optical reader.

5. The detector assembly of claim 2 in which said fourth optical member comprises a mirror member secured to a third support member, and in which said third support member includes means for locating the third support member on the first support member.

6. The detector assembly of claim 5 in which said mirror member is molded into said third support member.

7. The detector assembly of claim 5 in which said locating means comprises pin members for locating and securing the third support member to said first support member.

* * * * *